United States Patent [19]
Plumat et al.

[11] 3,773,487
[45] Nov. 20, 1973

[54] FABRICATION AND CHEMICAL TEMPERING OF VITREOUS PRODUCTS

[76] Inventors: Emile Plumat, Gilly; Robert Van Laethem, Loverval; François Toussaint, Lodelinsart, all of Belgium

[22] Filed: Apr. 23, 1968

[21] Appl. No.: 723,360

[30] Foreign Application Priority Data
Apr. 25, 1967  Luxembourg .................... 53,508
Mar. 29, 1968  France ........................ 68146619

[52] U.S. Cl. .................... 65/30, 65/95, 65/114
[51] Int. Cl. .................. C03c 21/00, C03b 13/00
[58] Field of Search .............. 65/30, 114, 116; 117/124

[56] References Cited
UNITED STATES PATENTS

| | | | |
|---|---|---|---|
| 3,218,220 | 11/1965 | Weber | 65/30 X |
| 3,287,201 | 11/1966 | Chisholm et al. | 65/30 X |
| 3,393,987 | 7/1968 | Plumat | 65/30 X |
| 3,395,998 | 8/1968 | Olcott | 65/30 |
| 3,410,673 | 11/1968 | Marusak | 65/30 |
| 3,505,047 | 4/1970 | Plumat | 65/30 |

*Primary Examiner*—S. Leon Bashore
*Assistant Examiner*—Kenneth M. Schop
*Attorney*—Spencer and Kaye

[57] ABSTRACT

A process and apparatus for chemically tempering articles of glass or other vitreous or vitrocrystalline materials by replacing ions initially present in the surface layers of such article by smaller ions as the article is undergoing a primary forming operation while still in a molten or softened state.

17 Claims, 1 Drawing Figure

INVENTORS.
Emile Plumat
François Toussaint
Robert Van Laethem
BY Spencer & Kaye
ATTORNEYS.

FABRICATION AND CHEMICAL TEMPERING OF VITREOUS PRODUCTS

BACKGROUND OF THE INVENTION

The present invention relates to vitreous or vitrocrystalline products, and particularly to the chemical tempering of such products as they are undergoing their primary forming operation.

In the fabrication of glass articles, for example glass sheets and hollow glass articles, it is current practice to temper such articles in order to improve their mechanical properties. One well-known type of tempering is known as thermal tempering and is carried out by heating the article to a temperature close to its softening point and then rapidly cooling the article in a current of air.

It is also well known to chemically temper glass articles by causing metallic ions to penetrate into surface layers of the glass, the ions being derived from a medium which is in contact with the glass surfaces and which is subjected to suitable treatment conditions.

There are, in general, two basic types of chemical tempering. A first type involves an exchange of ions between the glass and the communicating medium at a temperature which is sufficiently high to permit stress relaxation to occur in the glass, the ions penetrating into the glass being of such a type as to impart a reduced coefficient of thermal expansion to the glass surface layers. These ions are normally of a smaller diameter than the ions which they replace in the glass. According to the second type of chemical tempering, ions initially present in the glass surface layers are replaced by ions having a larger diameter and the ion exchange is carried out while the glass surface layers are maintained at a temperature below the annealing point of the glass (corresponding to a viscosity of $10^{13.2}$ poises) so that substantial stress relaxation does not occur.

Thermal tempering of fabricated glass articles has certain serious disadvantages, notably in that there is a considerable risk that the articles will be deformed thereby. Moreover, thermal tempering can not be applied to thin glass sheets having a thickness of less than about 3 mm.

The known chemical tempering processes also present several substantial shortcomings. Certain disadvantages of these processes result from the fact that they cause compression forces to be created only to a very small depth below the article surfaces. In other words, the compression forces are imparted to only very thin surface layers of such articles. This is particularly true when ions initially present in the glass are replaced by larger ions. As a result, the compression stress gradient, which extends to just below the article surfaces, is very steep. This constitutes one characteristic which, when the glass is fabricated for various uses, such as for vehicle windshields, presents a serious disadvantage.

SUMMARY OF THE INVENTION

It is a primary object of the present invention to substantially reduce these drawbacks and difficulties.

Another object of the invention is to substantially improve the results produced by chemical tempering processes.

Yet another object of the invention is to increase the depth of ion penetration in such processes.

A further object of the invention is to decrease the concentration gradient of ions diffused into the surface layers of glass and vitrocrystalline material articles.

Yet a further object of the invention is to substantially increase the mechanical strength of such articles.

These and other objects according to the invention are achieved by the provision, in a process for forming molten or softened glass into a shaped article, which process includes carrying out a primary forming operation, of the improvement composed of bringing the glass, while it is still in the molten or softened state during the primary forming operation, into contact with an ionized medium constituting a source of ions which are of smaller diameter than at least one type of ions initially present in the glass, and permitting these smaller ions from the medium to diffuse into the glass, in regions which will constitute surface layers of the resulting article, in exchange for such ions initially present in the glass, such diffusion occurring before the glass has assumed its final form.

The objects according to the invention are also achieved by the provision of a glass body whose surface layers are compressively stressed by chemically tempering the body to cause ions initially present in the glass to be replaced by ions having a smaller diameter, and by the displacement of ions into and toward the interior of the body before it has assumed its final form.

Finally, the invention includes apparatus for forming molten or softened glass into a shaped article. This apparatus essentially includes shaping means for subjecting the glass to a primary forming operation while it remains in its molten or softened state, and means associated with the shaping means for delivering an ionized medium, containing ions of smaller diameter than one type of ions initially present in the glass, into contact with the glass in the shaping means for permitting the smaller-diameter ions to replace the one type of ions in the glass before the glass has been formed into its final shape.

BRIEF DESCRIPTION OF THE DRAWINGS

The single FIGURE of the drawings is a simplified, cross-sectional, elevational view of a portion of a drawing apparatus provided with one preferred embodiment of the present invention.

DESCRIPTION OF THE PREFERRED EMBODIMENTS

Figure 1:
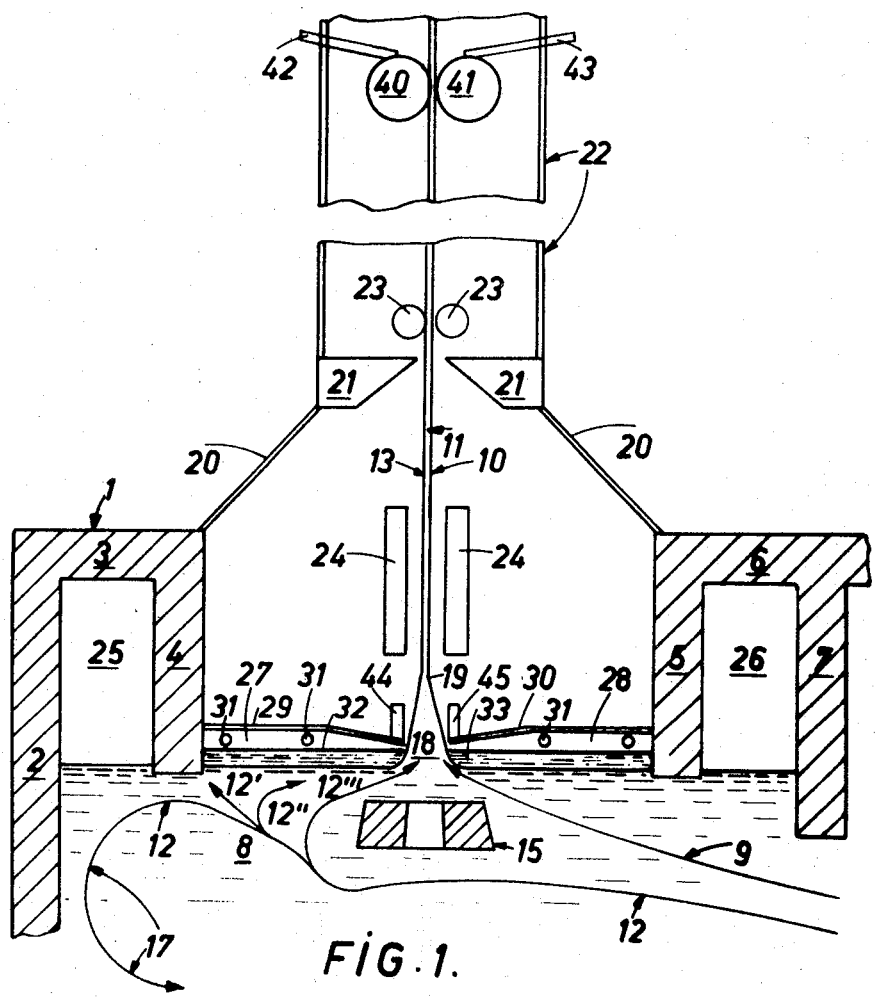

In accordance with the present invention, molten or plastic glass is, while it is being fashioned for the purpose of fabricating a sheet, band or other shaped article, placed in contact with an ionized medium furnishing ions of smaller diameter than larger ions originally present in the glass, which smaller ions replace the larger ions in order to cause a quantity of the smaller ions to penetrate into the glass portions which will form at least certain surface zones of the article, this penetration being effectuated before the glass has been given its final form. Protons, i.e. hydrogen atoms which have lost their electron, are to be considered in the group of smaller-diameter ions.

It is one of the principal advantages of the present invention that it permits glass articles having an appreciable tensile strength to be fabricated from ordinary glass having inexpensive constituents, such as silica, lime, soda and feldspar.

The invention is not, however, limited to the use of vitrifiable mixtures of ordinary soda-lime glass as the starting material. It should be appreciated that it is also possible to utilize vitrifiable mixtures of glass which, either spontaneously or as the result of a suitable subsequent treatment, undergo a certain crystallization so that the material becomes vitro-crystalline. However, for purposes of simplicity, the following description will be given with reference to articles made only of glass.

While the invention can be advantageously applied to the construction of glass articles by pressing, blowing, or by any other primary fashioning, or forming, operation, the invention can be applied with particular advantage to the fabrication of products made from drawn glass, for example drawn glass ribbons which are to be cut into sheets, as well as fibers, strips and drawn tubes.

The ion exchange is preferably effectuated completely or principally while the glass is at a temperature above its softening point. The softening point is at a temperature which is approximately equal to 1.15 times the annealing temperature of the material. In the case of ordinary soda-lime glasses, which were first mentioned above, the softening point is approximately equal to 620°C.

It is particularly preferable that the ion exchange begin at least when the glass is at a temperature above its mobility point. The mobility point is here defined as being equal to 1.55 times the annealing temperature of the material. In the case of the above-mentioned soda-lime glasses, the mobility point is around 840°C.

Thus, in the drawing of glass, the ion exchange between the glass and the medium in contact therewith preferably commences at least before and/or when glass attains the drawing meniscus. Optimum results are obtained when the ion exchange is caused to take place either completely or in large measure before the glass leaves the meniscus. It has been found that the present invention offers several very important advantages. For example, it has been noted that the ions provided by the treatment medium penetrate more deeply into the glass than when the same glass was chemically tempered according to the prior-art processes. The improvement is both substantial and surprising. It appears to be due, at least to a certain extent, to the internal movement which is produced in the glass body after the smaller-diameter ions have penetrated therein. In addition, the penetration into the glass by the ions coming from the treatment medium has been found to be remarkably uniform.

The invention also offers another important advantage. A tempered glass article can be produced more easily and at lower cost when the tempering process according to the invention is used than when a prior-art chemical tempering process is used. One reason for this is that the process according to the invention eliminates the need for costly reheating processes which, until the present, had of necessity to precede the ion exchange. In contradistinction thereto, according to the present invention, the article is tempered before being completely shaped.

In preferred embodiments of the present invention, the ion exchange which is carried out during the primary forming operation is an exchange of alkali metal ions. For example, it may involve an exchange of sodium ions initially present in the glass for lithium ions provided in the medium utilized for treating the glass. However, this is not absolutely essential. Lithium ions present in lithium-containing glass can be replaced by protons.

It is possible to produce very high surface compression stresses without creating the risk that the article will break or chip during cooling. Because of the greater depth of penetration of the ions into the glass, it is possible to obtain lower compression stress gradients in the surface layers of the glass and the glass can then be cut without breaking. The present invention makes it possible to produce sheets of tempered glass, for example vehicle windshields, which, if they should break, will spontaneously divide into small noncutting fragments.

The invention can also be applied for producing tempered glass in the form of sheets having a thickness of less than 3 mm. When the ion exchange is effectuated between a medium serving to treat the glass and the molten medium flowing in and/or towards the meniscus in a drawing chamber, as will be described in greater detail below, the ions diffuse into the glass symmetrically with respect to the median plane of the drawn glass sheet. It is, however, possible to carry out the invention in such a manner as to produce compressive stresses only in one of the surfaces of the sheets. The medium used for treating the glass can be liquid or gaseous. Examples of liquid mediums are a molten salt or a mixture of molten salts. Gaseous mediums can be constituted by one or more salts, and preferably a nitrate, a sulphate, or a mixture of these two salts, which vaporize at a temperature below that at which the glass is to be treated. The effect, when a gaseous medium is utilized, is slower than that observed when the medium is constituted by molten salts.

In particular, when the glass treatment medium is constituted by one or more molten salts, a thin film of the medium serving to treat the glass can adhere thereto. For example, when the ion exchange takes place in the chamber in which the glass sheet is drawn, as has been mentioned above, a thin film of the treating medium can be caused to adhere to the glass ribbon as it leaves the meniscus.

If it is desired to terminate any given ion exchange between this coating and the glass, this can be accomplished by cooling the coating, for example by means of several coolers situated along the path of the ribbon or by blowing a cooling fluid against the coated ribbon. The adherent film of the medium in question could also, in certain cases, be so thin that this special cooling is not necessary. The adherent film could rest in place in order to protect the glass surfaces against any deterioration due to the action of gas currents present in the shaping machine.

The replacement of ions initially present in the glass by smaller-diameter ions during the course of the primary operation for forming the glass could be followed by a second ion exchange in which the ions introduced into the glass during the first ion exchange are replaced by larger-diameter ions. Such larger-diameter ions could be, for example, the ions of the element which was replaced during the course of the first ion exchange. However, the ions introduced into the glass in the second ion exchange are preferably of larger diameter than the ions of the glass which were replaced during the first ion exchange.

Thus, if sodium ions initially present in the glass are replaced by lithium ions during the first ion exchange, potassium, rubidium or cesium ions could be introduced in substitution for the lithium ions by the second ion exchange. The larger-diameter ions could also be ions of an alkaline earth metal, such as calcium or magnesium.

The effect of the second ion exchange is to reinforce the glass article. The second ion exchange can be, and preferably is, carried out during the cooling of the glass following the first ion exchange and after the glass has attained a temperature below its annealing point.

In the low-temperature chemical tempering processes, which involve the replacement of ions initially present in the glass surface layers by larger-diameter ions, when the surface layers are at a temperature below the annealing point the larger-diameter ions can not penetrate very deeply into the glass. However, it has been noted that when an ion exchange of the type involving the substitution of larger-diameter ions for the ions present in the glass follows a substitution of smaller-diameter ions for the ions initially present in the glass in accordance with a process according to the invention, the larger-diameter ions then penetrate more easily and more deeply into the glass. The deeper the penetration of the small-diameter ions during the first ion exchange process, the deeper will be the penetration of the larger-diameter ions into the glass during the second ion exchange. It is possible to create very high compressive stresses in the glass surface layers by the introduction of larger-diameter ions, while ensuring that the concentration gradient of the large-diameter ions, as a function of the distance below the surface of the glass, is not unduly high.

The quantity of ions penetrating into the glass per unit time during an ion exchange operation and the depth to which the ions penetrate in the glass depend, among other things, on the temperature and the concentration of the ions in the medium in contact with the glass. This concentration can be controlled by using a medium having a controlled portion of an ingredient which does not diffuse and of another ingredient which does not produce compression stresses. This expedient is particularly useful during the first ion exchange for preventing the smaller-diameter ions from penetrating too deeply into the glass. For example, when, during a first ion exchange, lithium ions are introduced into sodium or potassium glass, one may use, for treating the glass, a medium of molten sodium salts and lithium salts, the latter being present in a small proportion.

The medium used for the second ion exchange treatment could, like the first, be liquid or gaseous.

For example, when the invention is employed in the fabrication of a ribbon of drawn glass, the medium for the second ion exchange treatment could be one or more molten salts or a solution delivered to the drawing rollers of the drawing machine. If the glass carries a solidified film of the medium from the first treatment, this film coating will serve, to a certain extent, to inhibit the diffusion of the larger-diameter ions when the treatment zone for the second ion exchange is reached. However, it has been discovered that even under these conditions the larger-diameter ions will penetrate into the glass.

Any adherent film originating in the medium used for the first treatment of the glass could be entirely or partially removed from the glass by means of a solvent which could, for example, be water, a mineral oil, or an organic solvent, and if a second ion exchange is effectuated, the adherent film could be removed before this second ion exchange occurs in order to permit the larger-diameter ions (which exchange) to penetrate still more deeply into the glass. In the fabrication of a drawn glass ribbon, the solvent could be applied by means of rollers situated in the drawing chamber, the rollers being impregnated with solvent.

In a machine for drawing glass sheets, the glass ribbon is drawn rather rapidly and the successive portions of the ribbon each remain in the drawing chamber only two to five minutes. During this time the glass ribbon can cool substantially. For example, its temperature may drop from 500° to 80°C. Under these conditions, the larger-diameter ions will not penetrate into the glass to a sufficient extent to prevent the glass from being able to be cut into sheets upon leaving the machine, even if the diffusion of the larger-diameter ions into the glass has not been inhibited by the presence of a film coating on the ribbon. The diffusion of the large-diameter ions toward the internal layers of the glass can, in certain cases, continue to be produced after the glass sheet has left the drawing machine and it has been observed that the glass ribbon can still be cut even some time after having left the drawing machine.

The distribution of the smaller-diameter ions through a transverse cross section of the glass could be rendered more uniform if the internal layers of the glass were heated, for example to a temperature above the annealing point (corresponding to a viscosity of $10^{13.2}$ poises) while the surface layers are maintained at a temperature inferior to the annealing point in order to prevent the occurrence of stress relaxation.

We have found that if the interior of such an article is thus heated after it has been subjected to such a first ion exchange and second ion exchange, the second ion exchange involving the introduction of ions having a larger diameter than those which were replaced during the first ion exchange, and if the temperature and treatment time conditions relative to the internal heating are suitably chosen, there results a migration of the smaller-diameter ions which were introduced during the first ion exchange toward the interior layer of the glass. This migration is accompanied by a migration toward the exterior of ions of a component of the initial vitrifiable mixture and sometimes also by a displacement toward the exterior of a certain number of the larger-diameter ions which were introduced during the second ion exchange.

An examination of a glass sheet submitted to such an internal heating reveals that the surface layers of the glass were subjected to very high compression stresses. Moreover, there is found to be a practically uniform concentration of the smaller-diameter ions, which were introduced during the first ion exchange, across the central internal zone of the sheet, while in the external zones of the sheet there was a progressive decrease from the central zone toward the sheet surfaces in the concentration of the ions of the substituted component which was initially present in the vitrifiable mass. There was also found to be an increase toward these surfaces in the total concentration of the larger-diameter ions and the smaller-diameter ions introduced during the second ion exchange and the first ion exchange, respectively.

The glass body thus treated according to the invention is not necessarily in the form of a glass sheet, but could, for example, be in the form of a rod, a hollow glass article wall, a tube, or a glass ribbon.

Because of the improved physical properties of the solid body treated according to the invention, such a body should be considered to be patentably novel in and of itself.

The internal heating could be carried out by exposing the glass body to a thermal radiation a large proportion of which penetrates into the interior layers of the glass while the glass body is in contact with a gaseous medium which is maintained at a temperature below the annealing point of the glass. Suitable thermal radiation sources could be constituted by electric resistance heaters or members whose surfaces are heated to incandescence by the combustion of a gas.

The spectral composition of the thermal radiation should be so chosen with respect to the composition of the glass body to be treated that the appropriate radiation will be absorbed by the interior layers of the glass. For example, radiant heating elements will rapidly heat the internal layers of a sheet of drawn soda-lime glass if the elements are at a temperature of 1,200°C or higher.

The radiant heat source or sources utilized can be placed in a treatment chamber through which is circulated the gaseous medium for maintaining the surfaces of the glass body at a suitable temperature.

The thermal treatment is evidently influenced not only by the temperature conditions but also by the duration of the exposure of the glass to the radiation. In treating ordinary soda-lime glass sheets of the type primarily considered, it is possible, by an appropriate choice of the heating elements, to heat the internal layers of the glass to a temperature of 560°C during a period of 24 hours or to a temperature of 750°C during a period not exceeding 30 minutes.

Any film which adheres to the glass is preferably removed prior to the above-described internal heating procedure.

An article fabricated according to the present invention can be subsequently subjected to a complementary chemical tempering treatment of the low-temperature type. For example, this could be achieved by heating the article and by then replacing certain ions then present in the glass with larger-diameter ions, this being effectuated at a temperature below the annealing point of the glass. This complementary chemical tempering could be effectuated whether or not a second ion exchange had been performed during the cooling of the article in the course of the primary forming operation and whether or not the article had been subjected to an internal heating of the type described above.

When such a complementary thermal tempering is employed, it has been found that the larger-diameter ions penetrating into the glass from the medium employed for this complementary tempering penetrate deeply into the glass in such a manner that the resulting increase in the compression stresses imparted to the glass surfaces is not accompanied by an undesirable increase in the steepness of the compression stress gradient measured from the surface toward the interior of the glass.

While it is primarily considered to employ ordinary soda-lime glasses as the starting materials for the present invention, it is also possible to utilize borosilicate or phosphosilicate glasses, or any other vitreous material, and in particular vitreous materials formed from vitrifiable mixtures containing at least one oxide or other compound of at least one element selected from the group consisting of Si, B and P, examples of such compounds being $SiO_2$, $B_2O_3$ and $P_2O_5$. Use can also be made of vitrifiable mixtures containing at least one compound selected from the group consisting of $As_2O_5$, $GeO_2$, $GeS_2$ and $TiO_2$. Use can even be made of chalcogenide glasses.

As has been mentioned above, the invention also involves apparatus for carrying out the processes described above. This apparatus essentially includes shaping means for subjecting the glass to a primary forming operation while it remains in its molten or softened state, and means associated with the shaping means for bringing the ionized medium into contact with the glass when the latter is still in the shaping means and before the glass has been formed into its final shape.

In particular, the invention involves apparatus of the type defined in which the forming means is a glass-drawing machine. The means utilized for bringing the ionized medium into contact with the glass serves to maintain the liquid and/or gaseous ionized medium in contact with the surface of the molten glass which is flowing into and/or toward the meniscus of the drawing bath. The apparatus can include means for cooling the films of the ionized medium which adhere to the glass at the meniscus or very close thereto.

A machine of this type for drawing glass according to the Pittsburgh process is shown in detail in the single FIGURE of the drawings.

The apparatus shown in the FIGURE includes a drawing chamber 1 delimited by refractory walls 2, 3, 4, 5, 6 and 7. The wall 2 is the end wall of the drawing chamber and the wall 7 is the screen, or shut-off. The suspended walls 4 and 5 extend down as far as about 1 cm below the surface of the molten glass bath 8.

Certain principal glass currents existing in the bath 8 are indicated by the arrows and include a forward current 9 feeding the rear portion 10 of the drawn glass sheet 11 and a forward current 12 which flows under the drawing bar 15. Beyond the bar 15, three secondary currents 12', 12'' and 12''' branch off from the current 12 and supply glass for the front portion 13 of the drawn glass ribbon. The remainder of current 12 flows downwardly and forms the colder return current 17.

The glass which is drawn upwardly from the bath 8 forms a meniscus 18 along which the thickness of the glass is reduced as the glass is drawn upwardly. The thickness of the glass at the apex of the meniscus is nearly, but not completely, equal to the final thickness of the drawn glass ribbon 11.

The ribbon is drawn upwardly through the drawing chamber whose upper portion is delimited by inclined walls 20 and catch pans 21. The ribbon then passes through the section 22 of the machine in which are disposed successive pairs of drawing rollers 23. The surfaces of the glass drawn through the drawing chamber are cooled by coolers 24.

Between the walls 2, 3 and 4 and the surface of bath 8 is disposed a compartment 25, while a similar compartment 26 is delimited above the bath by the walls 5, 6 and 7. This latter compartment 26 is supplied with $Li_2SO_4$ vapors. The molten glass directly exposed to the vapors in compartment 26 is at a temperature of 1,080°C, while the glass directly below compartment 25 is at a temperature of 1,050°C.

The shallow spaces 27 and 28 situated above the surface of the bath in the drawing chamber in front of and behind, respectively, the meniscus 18 are separated from the upper portions of the drawing chamber by walls 29 and 30, respectively, made of inoxidizable material. The height of the walls 29 and 30 above the bath can be adjusted by any suitable means (not shown). Tubes 31 extend into the spaces 27 and 28.

Layers 32 and 33 of molten salt are provided to float upon the surface of bath 8 in the region below walls 29 and 30, respectively, in such a way as to communicate with the spaces 27 and 28, respectively. A heat exchange fluid is caused to circulate through these spaces for maintaining the molten salt layers at a predetermined constant temperature. These molten salt layers may, for example, have a thickness of the order of 3 cm and the following composition, by weight:

| | |
|---|---|
| $Li_2CO_3$ | 6% |
| LiCl | 4% |
| $NaNO_3$ | 90% |

The temperature of the glass in contact with the layer 32 decreases in a direction toward the meniscus from a value of 1,050°C to a value of 900°C, while the temperature of the glass in contact with the layer 33 similarly decreases toward the meniscus from a value of 1,080°C to a value of 900°C.

In an upper portion of the section 22, at a level where the temperature of the glass ribbon is below its annealing point, there is provided a pair of rollers 40 and 41 made of porous asbestos. These rollers are fed, by conduits 42 and 43, respectively, with a mixture of molten salts composed of $KNO_3$ and $KNO_2$. The rollers 40 and 41 are driven at the same surface velocity as the drawing rollers.

At the inner ends of the walls 29 and 30 there are provided coolers 44 and 45, respectively.

As the drawing of the glass continues, a small quantity of $Li_2SO_4$ is drawn along, from the compartment 26, by the forward current 9 and, as a result, a small concentration of lithium is maintained in the glass ribbon 11. The forward current is directly enriched in lithium starting from the location of compartment 26, as well as being so enriched starting from the molten salt layer 33. At the same time, the glass of the forward current 12 acquires lithium derived from the molten salt bath 32 to which it is adjacent. In consequence, the quantities of lithium which diffuse into the formed glass in the forward and rear halves 10 and 13 of the glass ribbon are practically identical.

The quantities of salt present in the compartment 26 and in the layers 32 and 33 are preferably replenished in a continuous manner.

The films of salt which adhere to the surfaces of the drawn glass when it rises in the meniscus are solidified by the coolers 44 and 45 and these coolers also reduce the temperature of the surface layers of the glass in the meniscus down to a relatively low value. Because of the cooling of these thin layers, the ion exchange between the salt and the glass ceases practically completely by the time the glass reaches the level of the meniscus apex 19.

During the course of an experimental production run in which the drawn glass was formed starting from a vitrifiable mixture having the following percentage composition, by weight:

| | |
|---|---|
| $SiO_2$ | 70% |
| $Na_2O$ | 12% |
| CaO | 10% |
| MgO | 3% |
| $Al_2O_3$ | 5% | samples of glass were taken from the resulting ribbon at a location situated above coolers 24. They were then cooled and examined.

These examinations revealed that the lithium ions had penetrated down to the median plane of the glass ribbon. In this central internal zone, 5 percent of the sodium which had originally been present had been replaced by lithium. The lithium concentration gradient increased progressively toward the exterior up to the surfaces of the ribbon where 15 percent of the sodium which was initially present had been replaced. The lithium concentration gradient was very shallow.

When passing between the rollers 40 and 41, the glass ribbon is brought into contact with the potassium salts and the potassium ions deriving from these salts diffuse into the glass. An examination of glass samples which were cut from the glass ribbon after it had left the drawing machine revealed that the potassium ions had diffused into the glass and had replaced both sodium and lithium ions. The potassium ions had penetrated into the glass down to a depth of several microns from each surface of the glass ribbon. Depending on the temperature of the rollers and on the drawing speed, this depth ranges from 3 microns to 20 microns.

If, by way of comparison, the potassium salts had been brought into contact with a glass ribbon which was identical with the one described above and which had been fabricated under identical conditions, with the exception that it had not been first subjected to a penetration of lithium ions, the potassium ions would not have penetrated into the glass to a depth of greater than 2 microns and the potassium ion concentration gradient would, as a result, have been much higher. In the test run carried out according to the invention, potassium ions replaced 5 percent of the sodium ions initially present in the glass surface. The concentrations of both sodium and lithium ions at the interior of the glass were found to be changed by a small amount solely as a result of the second ion exchange process.

These two ion exchange processes according to the invention had the effect of tempering the glass, i.e. of subjecting the external glass layers to compression stresses and of diminishing the coefficient of thermal expansion of these layers. At the same time, because the tempering extended to a substantial depth below the surfaces of the glass ribbon, the ribbon was capable of being cut very easily.

A sample of this tempered glass was exposed to thermal radiation after having been washed and the internal layers of the glass were maintained for 30 minutes at a temperature of 600°C, i.e. at a temperature well above the annealing point of the glass (the annealing point of this glass being 540°C). During the thermal radiation, the glass was maintained in a gas current in such a manner that its surfaces were maintained at a temperature below the annealing point. The glass was then cooled at the end of this treatment.

Examination of this glass revealed that the deepest layers of the sheet had been enriched in lithium, in comparison with the concentration existing at these layers before the internal heating treatment, and that there was less lithium near the surfaces of the sheet. It was therefore evident that a migration of the lithium had occurred in a direction from each surface of the glass sheet toward the internal zones thereof. The lithium which had left the surface zones of the sheet had been replaced by sodium. The concentration of potassium near the surfaces of the sheet was practically the same as it had been before the internal heating, although the potassium concentration gradient at the interior of the glass was less than before the heat treatment.

As a result of the changes produced by the heat treatment, the final glass article was very similar to an article which is fabricated starting with a sodium-lithium glass which is strongly chemically tempered by the introduction of potassium and sodium ions into the surface layers of the glass.

Because of the shallow compression stress gradients present at shallow depths below the surfaces of tempered glass sheets produced according to the present invention, there was found to be very little, if any, risk that the glass would explode or chip spontaneously. In fact one observes that the zone under compression is large and that the value of the compression does vary much more slowly than in the case of a normal chemical tempering.

After the internal heating treatment according to the invention, a sample of the glass which had thus been treated was subjected to a low-temperature chemical tempering which was effectuated by immersing the glass in a bath of molten potassium nitrate in order to cause potassium ions to penetrate into the glass. The potassium ions then penetrated into the glass sheet down to a depth of 100 microns from each surface and mainly replaced lithium ions. The resulting glass was very strongly tempered and could not be cut.

Presented below are the ingredients of three other compositions A, B and C of vitrifiable materials utilized for the manufacture of tempered glass sheets by processes according to the invention which are similar to that described above. For each composition, the percentage of each ingredient is, by weight:

|  | A | B | C |
|---|---|---|---|
| $SiO_2$ | 70% | 72% | 64% |
| $Na_2O$ | 12% | 11% | 11% |
| CaO | 6% | 6% | 6% |
| MgO | 7% | 6% | 6% |
| $Fe_2O_3$ | — | — | traces |
| $B_2O_3$ | — | — | 8% |
| $Al_2O_3$ | 5% | 5% | 5% |

A further example will now be presented.

A disk of a chalcogenide glass of following composition (in percentages by weight):

| | |
|---|---|
| $GeS_2$ | 80 |
| CdS | 10 |
| $Na_2S$ | 10 | was formed by pouring the vitreous melt on a refractory plate, which is at 460°C (softening temperature : 344°C) in an atmosphere of dry hydrogen sulfide gas. The plate is then cooled below the annealing temperature of the glass. A large amount of sodium ions in the glass are exchanged by hydrogen ions during this forming and cooling processes. When the temperature falls below 280°C, the disk is placed in a liquid mixture composed of 60% NaCl and 40% $AlCl_3$, from which the disk is taken away when the temperature is 150°C. A second low temperature treatment is performed by maintaining the disk for 24 hours in a bath of a liquid mixture composed of 60% KCl and 40% $AlCl_3$ at a temperature of 27°C.

The tensile strength of the disk thus obtained was 12 times as large as the strength of a disk of same composition but not treated.

When the three ion exchanges have been performed, it is no longer possible to cut the disk; this however can easily be done before the third treatment.

A last example follows now.

A sheet of borosilicate glass, 2 mm in thickness, of following composition:

| | |
|---|---|
| $SiO_2$ | 43.3 % |
| $B_2O_3$ | 36.1 % |
| $Na_2O$ | 20.6 % | has been drawn while it was in contact with liquid lithium chloride. The softening point of this glass is 575°C. At this temperature the sheet is freed from the solidified lithium chloride film on its surfaces. An appreciable amount of sodium ions has been replaced by lithium ions. The concentration of this lithium ions varies from 4 percent in the interior up to 12 percent in external layers.

The glass is cooled without subsequent ion exchanges. It can very easily be cut and the tensile strength is three times as large as the strength of a not treated control sheet.

It will be understood that the above description of the present invention is susceptible to various modifications, changes and adaptations, and the same are intended to be comprehended within the meaning and range of equivalents of the appended claims.

We claim:

1. In a process for fabricating molten or softened glass into a tempered glass shaped article, which process includes carrying out a primary forming operation, the improvement comprising:
   a. bringing the glass, while it is still in the molten or softened state during the primary forming operation, into contact with an ionized medium constituting a source of exchangeable ions which are of smaller diameter than at least one type of exchangeable ions initially present in the glass,
   b. permitting the smaller exchangeable ions from the medium to diffuse into the glass, in regions which will constitute surface layers of the resulting article, in exchange for such exchangeable ions initially present in the glass, such diffusion occurring before the glass has assumed its final form,
   c. bringing the glass to a temperature below its annealing point after permitting smaller ions to diffuse into the glass, and
   d. effecting a second ion exchange by replacing the ions which diffused into the glass by larger-diameter ions while the glass is being cooled starting from the primary forming operation.

2. A process as defined in claim 1 wherein said primary forming operation is a glass-drawing operation.

3. A process as defined in claim 2 wherein the glass is drawn from a meniscus produced in a glass-drawing bath and said step of permitting smaller ions to diffuse into the glass commences at the latest while the glass is in such meniscus.

4. A process as defined in claim 1 wherein the diffusion of ions into the glass takes place at least principally while the temperature of the glass is above its softening point.

5. A process as defined in claim 4 wherein the exchange of initially present exchangeable ions commences while the glass is at a temperature above its mobility point.

6. A process as defined in claim 1 wherein the at least one type of ions initially present in the glass are of sodium and the smaller ions from the medium are of lithium.

7. In a process according to claim 1 for forming molten or softened glass into a shaped article, which process includes carrying out a primary forming operation, the improvement comprising: (a) bringing the glass, while it is still in the molten or softened state during the primary forming operation, into contact with an ionized medium constituting a source of exchangeable ions which are of smaller diameter than at least one type of exchangeable ions initially present in the glass, (b) permitting the smaller exchangeable ions from the medium to diffuse into the glass, in regions which will constitute surface layers of the resulting article, in exchange for such exchangeable ions initially present in the glass, such diffusion occurring before the glass has assumed its final form, the ionized medium being in the form of a film on at least one surface of the glass for at least part of the ion exchange, and (c) cooling the film in order to terminate the exchange of ions between the glass and the medium.

8. A process as defined in claim 1 wherein the larger-diameter ions introduced into the glass by the second ion exchange are of larger diameter than the one type of ions which were replaced during said step of permitting smaller ions to diffuse into the glass.

9. A process as defined in claim 1 wherein the at least one type of ions initially present in the glass are constituted by sodium ions, the smaller ions which diffuse into the glass are lithium ions, and the second ion exchange involves the replacement of lithium ions in the glass by sodium ions.

10. A process as defined in claim 1 wherein the at least one type of ions initially present in the glass are sodium ions, the smaller ions which diffuse from the medium are lithium ions, and the second ion exchange involves the replacement of lithium ions in the glass by potassium ions.

11. A process as defined in claim 1 wherein the primary forming operation is carried out by drawing the glass into sheets in a drawing machine and the second ion exchange commences before the glass has left such machine.

12. A process as defined in claim 1 wherein the ionized medium is present on the glass in the form of a film during at least part of the time when a diffusion of smaller ions into the glass occurs, and comprising the further step of removing such film before the beginning of the second ion exchange.

13. A process as defined in claim 1 wherein the primary forming operation is constituted by a glass-drawing operation. and comprising the further step of cutting the drawn glass into sheets within a few minutes after the start of the diffusion of smaller ions into the glass.

14. A process for fabricating a tempered glass article, which process includes carrying out a primary forming operation, the improvement comprising (a) bringing the glass, while it is still in the molten or softened state during the primary forming operation, into contact with an ionized medium constituting a source of exchangeable ions which are of smaller diameter than at least one type of exchangeable ions initially present in the glass, (b) permitting the smaller exchangeable ions from the medium to diffuse into the glass, in regions which will constitute surface layers of the resulting article, in exchange for such exchangeable ions initially present in the glass, such diffusion occurring before the glass has assumed its final form, (c) exposing the resulting article to thermal radiation and controlling the temperature of the article surfaces so as to cause the temperature of the interior layers of the article to be raised while the surface layers thereof are maintained at a temperature below the annealing point of the glass, and (d) controlling the heating of the internal and surface layers for causing the smaller ions which had diffused into the glass to migrate toward the interior layers of the article which are furthest removed from the surface layers thereof.

15. In a process according to claim 1 for forming molten or softened glass into a shaped article, which process includes carrying out a primary forming operation, the improvement comprising (a) bringing the glass, while it is still in the molten or softened state during the primary forming operation, into contact with an ionized medium constituting a source of exchangeable ions which are of smaller diameter than at least one type of exchangeable ions initially present in the glass, (b) permitting the smaller exchangeable ions from the medium to diffuse into the glass, in regions which will constitute surface layers of the resulting article, in exchange for such exchangeable ions initially present in the glass, such diffusion occurring before the glass has assumed its final form, (c) reheating the article, (d) contacting the article with a medium constituting a soure of ions of larger diameter than ions present in the glass, and (e) causing the larger-diameter ions to replace such ions in the glass.

16. A process as defined in claim 15 wherein the larger-diameter ions are potassium ions and the ions which they replace are lithium ions or lithium and sodium ions.

17. In a process for fabricating molten or softened glass into a tempered glass shaped article, which process includes carrying out a primary forming operation, the improvement comprising:

a. bringing the glass, while it is still in the molten or softened state during the primary forming operation, into contact with an ionized medium constituting a source of exchangeable ions which are of smaller diameter than at least one type of exchangeable ions initially present in the glass, b. permitting the smaller exchangeable ions from the medium to diffuse into the glass, in regions which will constitute surface layers of the resulting article, in exchange for such exchangeable ions initially present in the glass, such diffusion occurring before the glass has assumed its final form, c. bringing the glass to a temperature below its annealing point after permitting smaller ions to diffuse into the glass, d. effecting a second ion exchange by replacing the ions which diffused into the glass by larger-diameter ions, e. exposing the resulting article to thermal radiation and controlling the temperature of the article surfaces so as to cause the temperature of the interior layers of the article to be raised while the surface layers thereof are maintained at a temperature below the annealing point of the glass, and controlling the heating of the internal and surface layers for causing the smaller ions which had diffused into the glass to migrate toward the interior layers of the article which are furthest removed from the surface layers thereof; and f. finally, reheating the article, contacting the article with a medium constituting a source of ions of larger diameter than ions present in the glass and causing the larger-diameter ions to replace such ions in the glass.

* * * * *

UNITED STATES PATENT OFFICE
CERTIFICATE OF CORRECTION

Patent No. 3,773,487  Dated November 20th, 1973

Inventor(s) Emile Plumat, Robert Van Laethem and Francois Toussaint

It is certified that error appears in the above-identified patent and that said Letters Patent are hereby corrected as shown below:

In the heading of the patent, after line 6, insert --[73] Assignee: Glaverbel S.A., Watermael Boitsfort, Belgium--. Column 3, line 7, change "vitro-crystalline" to --vitrocrystalline--. Column 6, line 3, after "which" insert --are introduced by the second ion--. Column 8, line 64, delete "directly exposed to the vapors". Column 12, line 2, change "27°C" to --270°C--. Column 14, line 35, change "soure" to --source--.

Signed and sealed this 9th day of April 1974.

(SEAL)
Attest:

EDWARD M. FLETCHER, JR.
Attesting Officer

C. MARSHALL DANN
Commissioner of Patents